(12) United States Patent
Butler et al.

(10) Patent No.: US 7,174,239 B2
(45) Date of Patent: Feb. 6, 2007

(54) RETRIEVING DIAGNOSTIC INFORMATION FROM AN HVAC COMPONENT

(75) Inventors: William P. Butler, St. Louis, MO (US); Steven L. Carey, Imperial, MO (US)

(73) Assignee: Emerson Electric Co., St. Louis, MO (US)

( * ) Notice: Subject to any disclaimer, the term of this patent is extended or adjusted under 35 U.S.C. 154(b) by 62 days.

(21) Appl. No.: 10/993,646

(22) Filed: Nov. 19, 2004

(65) Prior Publication Data

US 2006/0111795 A1 May 25, 2006

(51) Int. Cl.
*G01M 1/38* (2006.01)
*G05B 13/00* (2006.01)
*G05B 15/00* (2006.01)
*G05B 21/00* (2006.01)
*G05B 23/00* (2006.01)

(52) U.S. Cl. .............. 700/276; 700/207; 700/210; 700/275; 700/277; 236/1 B; 236/1 R; 236/1 C; 236/49.3; 165/200; 165/205; 165/208; 165/299; 62/186

(58) Field of Classification Search ............. 700/209, 700/210, 207, 208, 275, 276, 277; 236/1 B, 236/1 R, 49.3, 1 C; 165/200, 205, 208, 299, 165/300, 265, 266; 62/186
See application file for complete search history.

(56) References Cited

U.S. PATENT DOCUMENTS

| 6,176,777 | B1 * | 1/2001 | Smith et al. ................. 454/256 |
| 6,404,163 | B1 * | 6/2002 | Kapsokavathis et al. ..... 320/104 |
| 2004/0182096 | A1 * | 9/2004 | Alles ............................ 62/186 |
| 2004/0238653 | A1 * | 12/2004 | Alles .......................... 236/49.3 |
| 2005/0194455 | A1 * | 9/2005 | Alles ............................. 236/1 B |
| 2005/0264253 | A1 * | 12/2005 | Ivankovic .................... 318/685 |
| 2005/0280598 | A1 * | 12/2005 | Webb et al. ................. 343/867 |
| 2005/0281030 | A1 * | 12/2005 | Leong et al. ................ 362/234 |

* cited by examiner

*Primary Examiner*—Ramesh Patel
(74) *Attorney, Agent, or Firm*—Harness, Dickey & Pierce, P.L.C.

(57) ABSTRACT

A control is provided for controlling the operation of a climate control system, which includes a processor that is capable of receiving power from a low voltage power supply adapted to be connected to an external alternating current power source, or a second external low voltage power supply. The processor is capable of storing diagnostic information pertaining to the operating status of at least one component of the climate control system. The processor is configured to retrieve stored diagnostic information from memory pertaining to the climate control system and send the diagnostic information to the display means when the processor receives power from the external low voltage power supply and detects the absence of a connection to an external alternating current power source.

32 Claims, 2 Drawing Sheets

RETRIEVING DIAGNOSTIC INFORMATION FROM AN HVAC COMPONENT

BACKGROUND OF THE INVENTION

The present invention is generally related to controls for air conditioning and fuel-fired heating systems, and more specifically to controls for communicating diagnostic information relating to an HVAC component.

Many controls for controlling an air conditioner or heating appliance have the capability of reporting diagnostic information pertaining to various components of such climate control systems. The controls and components of these systems are often unnecessarily removed and replace by a contractor when troubleshooting or repairing a non-operating climate control system. Frequently, the removed controls or components are returned to a distributor for manufacturer's warranty credit. While such prior art controls provided diagnostic information pertaining to the control or various components of the climate control system, this diagnostic information was not available to the distributor once the control or component was removed from the climate control system. Furthermore, even if the distributor supplied power to the control or component to test the returned item, the distributor would be unable to determine the operating condition absent the climate control system. This prevents the distributor from determining whether the returned item is defective or in good operating condition. A distributor's acceptance of returned controls or components that are not defective results in unwanted and unnecessary manufacturer's warranty costs.

SUMMARY OF THE INVENTION

There is provided, in accordance with one aspect of the invention, a control for a heating system or an air conditioning system that comprises a microprocessor capable of determining the operating status of both the control and/or other components in the system, and a first low voltage power supply circuit connected to an external alternating current power source. The control further comprises a low voltage receptacle socket for connecting the control to a second external low voltage plug-in power supply, where the microprocessor is powered by either the first low voltage power supply circuit or the second external low-voltage power supply. When the microprocessor is powered by only the external low voltage power supply, the microprocessor detects the absence of an external alternating current power source and responsively retrieves and communicates stored diagnostic information relating to the operating status of at least the control. The microprocessor may also retrieve and communicate stored diagnostic information relating to at least one other component of the climate control system.

In another aspect of the present invention, a thermostat for controlling an air conditioner or heating appliance of a climate control system is provided that is capable of being powered after removal from the climate control system, for the purpose of retrieving operating condition information pertaining to the control or a component within the system.

In yet another aspect of the present invention, some embodiments of a thermostat may provide historical diagnostic information pertaining to the operation of the control or a component in the system, to enable evaluation of the historical diagnostic information relating to the operation or eventual failure of the control.

DETAILED DESCRIPTION OF THE INVENTION

Figure 1:
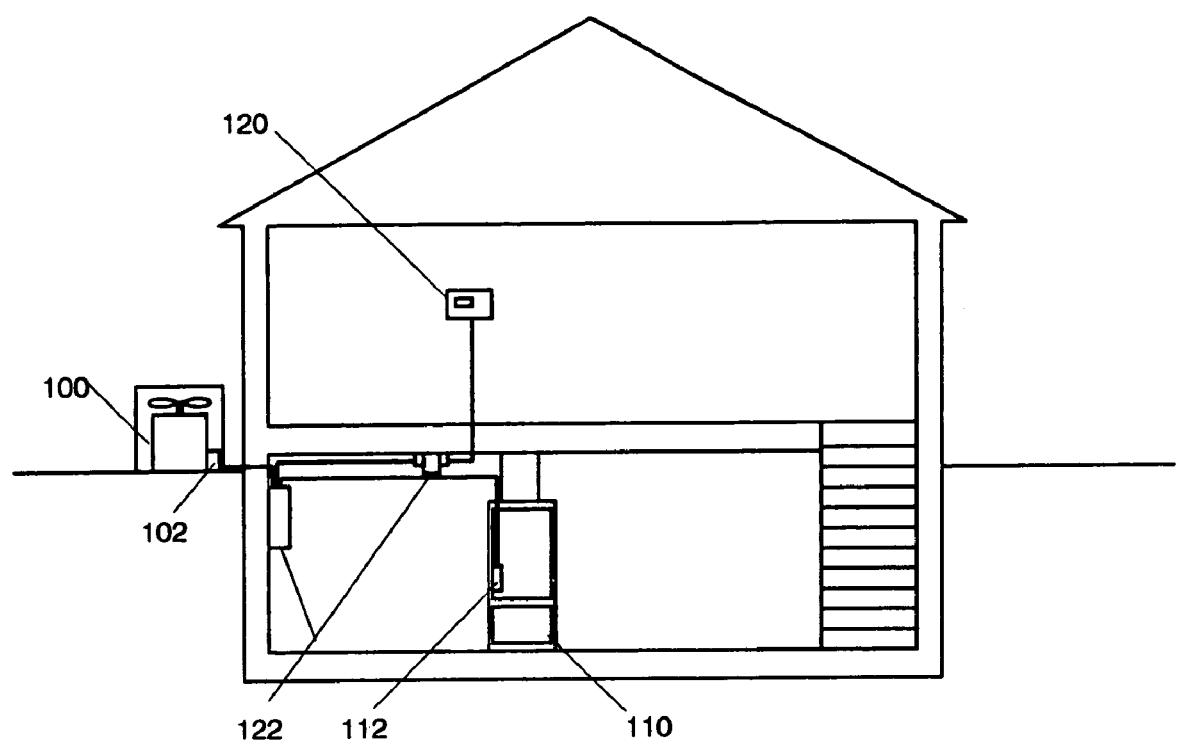
FIG. 1 is a diagram of a building having a climate control system that includes one embodiment of a control according to the principles of the present invention.

A typical climate control system for a building comprising a preferred embodiment of a control for an outside air conditioning condenser unit 100 or a heating appliance 110 in accordance with the present invention is shown in FIG. 1. The air conditioning unit 100 comprises a control 102, and the heating appliance 110 comprises an ignition control module 112. The controls for the climate control systems are each connected to an alternating current power source 122 within the building. Such air conditioning units and heating appliances may be removed and replaced by a contractor, and often are returned to a distributor for manufacturer's warranty credit.

Figure 2:
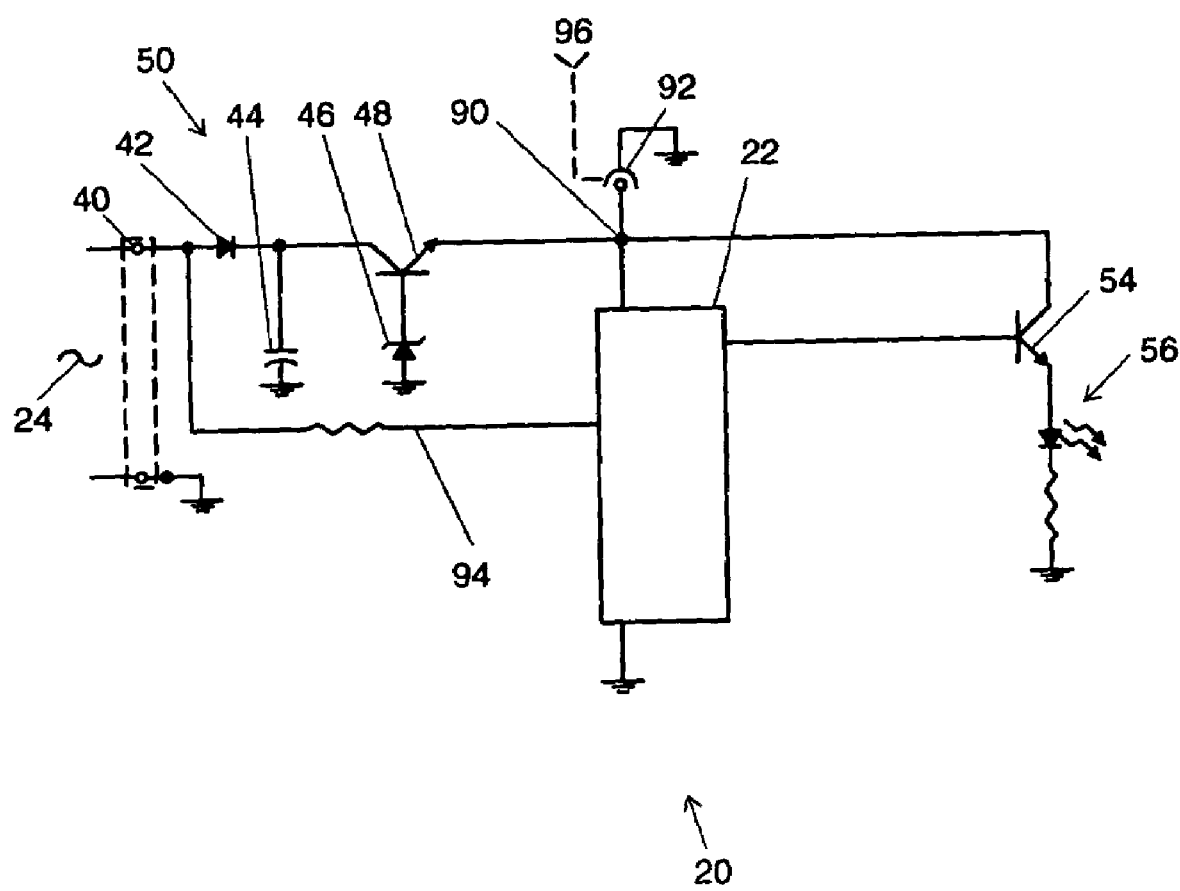
FIG. 2 is a schematic of one embodiment of a control according to the principles of the present invention.

A schematic diagram of one preferred embodiment of a control is shown in a schematic in Fig 2. The control 20 comprises a microprocessor 22 in connection with a low voltage power supply 50. This first low voltage power supply 50 for the control may be a 5 volt power supply for example, which may be connected to an external alternating current power source. In the preferred embodiment, the 5 volt power supply is connected at 40 to an external alternating current power source, which may be a 24 vac power source 24, for example. The control 20 further comprises a connector 92 adapted to be connected to a second external low voltage power supply 96. The connector is preferably a plug-in connector 92 for connection to an external low voltage wall plug-in power supply. The control is typically connected to a thermostat, and may also be connected to other components such as a pressure switch, igniter and gas valve in the case of a heating system or a compressor and condenser motor in the case of an air conditioning unit. The microprocessor 22 receives power from either the first low voltage power supply 50, or from a second external low voltage power supply 96 when a second low voltage power supply 96 is connected to the connector 92. As shown in FIG. 2 the 5 volt power supply 50 and the second external low voltage power supply connector 92 are both connected at node 90 to the microprocessor 22 in a manner such that the microprocessor may be powered by either low voltage power supply (50, 96). The low voltage power supply 50 is preferably a half wave regulated power supply, and comprises a diode 42 in series with a transistor 48, and also a regulating capacitor 44 and zener diode 46 for gating the transistor 48. The microprocessor may, for example, be capable of observing the number of failed compressor motor starts or condenser motor starts for an air conditioning unit. The microprocessor may also be capable of detecting a failure of an element in the control itself, and may responsively communicate the fault or failure of the control when later prompted. The microprocessor of the present invention is preferably a ST72C334 microprocessor 22 manufactured by ST Microelectronics, but may alternatively be a comparable microprocessor that is suitable for use in such applications.

The microprocessor 22 further comprises a non-volatile memory, which can be used to store the historical diagnostic information for future evaluation. Specifically, the microprocessor 22 may determine an operating condition or status based on a predetermined number of historical failures, and store the determined operating status in the non-volatile EEPROM memory of the microprocessor 22. If power to the control is interrupted, the historical diagnostic information and operating status will remain stored in EEPROM memory for future retrieval. An example of a situation where power could be interrupted is when the control is removed by a service technician for evaluation or return. After removal, the microprocessor 22 is capable of detecting the absence of a connection to the external alternating current power source 24, when the microprocessor 22 receives power from a second external low voltage power supply 96 that is connected to the connection 92. Specifically, when power to the control 20 is restored via an external 5 volt power source 96, the microprocessor 22 checks a connection 94 to verify the presence of a connection to an external alternating current power source at 40. The absence of an input at 94 to the microprocessor 22 indicates to the microprocessor that the control 20 is being powered through the second external low voltage power supply connection 92. Accordingly, the microprocessor 22 responsively retrieves the last stored operating condition or status and outputs a signal to a communication means for communicating information, such as the gate of a transistor 54 for switching 5 volts to an LED 56 for communicating the diagnostic information. It should be noted that the control may alternately communicate the signal to a device or location external to the control. The LED may be flashed on and off a predetermined number of times to indicate the control is in good operating condition, and another predetermined number of times to indicate a separate component is in good operating condition. The control may also flash the LED a predetermined number of times to indicate whether the control or a component is defective. In one embodiment of a control in accordance with the principles of the present invention, the control may be part of an outside air conditioning condenser unit that comprises a compressor that may have been removed by a contractor for return to a distributor. The distributor would be able to insert a standard low voltage power supply plug to the control and subsequently retrieve and communicate information relating to the control's operation for warranty evaluation. The control may further retrieve and communicate diagnostic information relating to the compressor's operating condition for warranty evaluation. The contractor would also be able to plug in a low voltage power supply to the control prior to removing the compressor, to determine whether the control or the compressor would be accepted for return under the manufacturer's warranty. In the event the control indicates a component such as a compressor is defective, the control can be further prompted to communicate historical diagnostic information for evaluating the cause of failure of the compressor.

In a second embodiment of a control in accordance with the principles of the present invention, the control may be part of a heating system such as a furnace or heat pump. The second embodiment similarly possesses a microprocessor 22 and a first low voltage power supply connected to an external alternating current power source. The first low voltage power supply may be a 5 volt power supply, for example. The first power supply and the second external low voltage power supply connector 92 are both connected at node 90 to the microprocessor 22 in a manner such that the microprocessor may be powered by either low voltage power supply. The low voltage power supply is preferably a half wave regulated power supply, and comprises a diode 42 in series with a transistor 48, and also a regulating capacitor 44 and zener diode 46 for gating the transistor 48. The microprocessor may for example be capable of observing the number of occurrences of a failed ignition attempt or pressure switch closure for a heating appliance, or the failure of the operation of the control itself. The microprocessor may also be capable of detecting a failure of an element in the control itself, and may responsively communicate the fault or failure of the control when later prompted.

The microprocessor 22 further comprises a non-volatile memory, which can be used to store the historical diagnostic information for future evaluation. Specifically, the microprocessor 22 may determine an operating condition or status based on a predetermined number of historical failures, and store the determined operating status in the non-volatile EEPROM memory of the microprocessor 22. If power to the control is interrupted, the historical diagnostic information and operating status will remain stored in EEPROM memory for future retrieval. An example of a situation where power could be interrupted is when the control is removed by a service technician for evaluation or return. When power to the control 20 is restored via an external 5 volt power source, the microprocessor 22 checks a connection 94 to verify the presence of an external alternating current power source 40. The absence of an input at 94 to the microprocessor 22 indicates to the microprocessor that the control 20 is being powered through the second external low voltage power supply connection 92. Accordingly, the microprocessor 22 responsively retrieves the last stored operating condition or status and outputs a signal to the gate of a transistor 54 for switching 5 volts to an LED 56 for communicating the diagnostic information. It should be noted that the control may alternately communicate the signal to a device or location external to the control. The LED may be flashed on and off a predetermined number of times to indicate the control is in good operating condition, and another predetermined number of times to indicate a separate component is in good operating condition. The control may also flash the LED a predetermined number of times to indicate whether the control or a component is defective. Such diagnostic information would be of value to both the service technician and the manufacturer in evaluating an operating failure of the control or a component in the system.

It should be noted that the method of communicating the diagnostic errors or information may alternatively be performed using an LCD display in place of an LED. The LCD display would be able to display a text message or a number indicating an operating condition or status. The LCD display would further be able to display historical diagnostic information for evaluating failures. The control may alternatively use an LED capable of displaying at least two colors, for indicating the control is either in good operating condition or is defective. Likewise, the control may also be able to communicate the diagnostic information to a computer, palm, or other external device through a simple connection such as an RS485 connection, or the like.

Additional design considerations, readily apparent to one of ordinary skill in the art, such as the modification of the control to provide an LCD display for display of diagnostic information, may also provide improved appliance operation. It should be apparent to those skilled in the art that various modifications such as the above may be made without departing from the spirit and scope of the invention. More particularly, the apparatus may be adapted to any of a variety of different air conditioning units, heat pump units and heating appliance controls. Accordingly, it is not intended that the invention be limited by the particular form illustrated and described above, but by the appended claims.

What is claimed is:

1. A controller for controlling the operation of at least one component in a climate control system, the controller comprising:
   a first low voltage power supply for the controller, which may be connected to an external alternating current power source;
   a plug-in connection which may be connected to a second external low voltage power supply to the controller;
   a processor that receives power from either the first low voltage power supply connected to an external alternating current power source, or from a second external low voltage power supply connected to the plug-in connection, wherein the processor is capable of detecting the absence of a connection to an external alternating current power source when receiving power from a second external low voltage power supply that is connected to the plug-in connection, and responsively communicates information relating to the operating condition of the controller or at least one component of the climate control system to a display device.

2. The controller of claim 1, wherein the processor further comprises a non-volatile memory for storing diagnostic information pertaining to the controller.

3. The controller of claim 1, wherein the processor further comprises a non-volatile memory for storing diagnostic information pertaining to at least one component in the climate control system.

4. The controller of claim 3, wherein the processor is further capable of determining the operating condition of at least one component of the climate control system and storing the diagnostic operating condition information pertaining to the at least one component of the climate control system in non-volatile memory.

5. The controller of claim 4, wherein the processor is further capable of communicating the stored diagnostic information to a location external to the controller.

6. The controller of claim 1, wherein the processor communicates diagnostic information pertaining to the controller or at least one component in the climate control system, or a combination thereof, to a display device when the processor receives power from the external low voltage power supply that is connected to the plug-in connection and detects the absence of a connection of an external alternating current power source to the first low voltage power supply for the controller.

7. The controller of claim 6, wherein the displayed diagnostic information comprises information relating to the operating condition of both the controller and at least one component of the climate control system.

8. The controller of claim 6, wherein the at least one component of the climate control system is an air conditioner compressor.

9. The controller of claim 6, wherein the displayed diagnostic information comprises information pertaining to the operating condition of the controller.

10. The controller of claim 9, wherein the controller controls the operation of a heating system.

11. In a climate control system comprising at least an air conditioning system or a heating system, a controller for controlling the operation of at least one component in the heating or air conditioning system comprising:
    a first low voltage power supply for the controller, which may be connected to an external alternating current power source;
    a low-voltage receptacle plug connector which may be connected to a second external low voltage power supply to the controller;
    a processor for controlling the operation of at least one component in the climate control system, wherein the processor is capable of determining the operating condition of the controller and at least one component of the climate control system, and the processor is capable of detecting the absence of a connection to the external alternating current power source when receiving power from a second external low voltage power supply that is connected to the low-voltage receptacle plug connector;
    a non-volatile memory for storing diagnostic information pertaining to the operating condition of the controller or at least one component in the heating or air conditioning system, or a combination thereof; and
    a communication means for communicating the diagnostic information, wherein the processor retrieves stored diagnostic information from memory pertaining to the controller or the at least one component in the heating or air conditioning system and outputs the diagnostic information to the communication means when the processor receives power from an external low voltage power supply connected to the low-voltage receptacle plug connector, and detects the absence of a connection to an external alternating current power source.

12. The controller of claim 11, wherein the diagnostic information comprises information pertaining to the operating condition of both the controller and at least one component of an air conditioning system.

13. The controller of claim 12, wherein the at least one component of the climate control system is an air conditioner compressor.

14. The controller of claim 11, wherein the diagnostic information comprises information pertaining to the operating condition of the controller, which controls the operation of a heating system.

15. The controller of claim 14, wherein the diagnostic information further comprises information pertaining to the operating condition of the heating system.

16. The controller of claim 15, where the communication means comprises a transistor for switching voltage to an LED.

17. The controller of claim 16, where the LED is capable of displaying at least two colors.

18. The controller of claim 15, wherein the communication means comprises a transistor for switching voltage to an LCD display.

19. The controller of claim 18, wherein the LCD display displays either an operable or an inoperable diagnostic status.

20. In combination with a climate control system comprising at least an air conditioning system or a heating system, a controller for operating at least one component in the heating or air con system comprising:
    a first low voltage power supply for the controller, which may be connected to with an external alternating current power source;
    a plug-in connection which may be connected to a second external low voltage power supply to the controller;
    a processor for controlling the operation of the climate control system, wherein the processor is powered by either the first low voltage power supply or a second external low voltage power supply, and wherein the processor is capable of detecting the absence of a connection to an external alternating current power source when the processor receives power from a second external low voltage power supply that is connected to the plug-in connection;

a memory for storing diagnostic information pertaining to the operating condition of the controller or at least one component in the heating or air conditioning system; and a display device for displaying the diagnostic information, wherein the processor retrieves stored diagnostic information and outputs the diagnostic information to the display device when the processor receives power from an external low voltage power supply that is connected to the plug-in connection and detects the absence of a connection of an external alternating current power source to the first low voltage power supply for the controller.

21. The combination of claim 20, wherein the processor is capable of determining the operating condition of the controller or at least one component of the climate control system, or a combination thereof, and storing diagnostic information pertaining to the operation condition of the controller or at least one component of the climate control system.

22. The combination of claim 21, wherein the processor retrieves stored diagnostic information from memory pertaining to the heating or air conditioning system and send the diagnostic information to the display device when the processor receives power from the external low voltage power supply that is connected to the plug-in connection and detects the absence of a connection of an external alternating current power source to the first low voltage power supply for the controller.

23. The combination of claim 22, wherein the plug-in connection comprises a low voltage receptacle plug connector.

24. The combination of claim 23, wherein the memory comprises a non-volatile memory.

25. The combination of claim 24, wherein the diagnostic information comprises information pertaining to the operating condition of at least one component of an air conditioning system.

26. The combination of claim 25, wherein the at least one component of the climate control system is an air conditioner compressor.

27. The combination of claim 24, wherein the diagnostic information comprises information pertaining to the operating condition of at least one component of a heating system.

28. The combination of claim 27, wherein the controller controls the operation of a heating system.

29. A controller for controlling the operation of a climate control system, the controller comprising:

a processor that is capable of detecting the presence of a connection of an external low voltage power supply to a plug-in connector, and the absence of a connection of an external alternating current power source to a low voltage power supply of the controller, and responsively retrieving stored diagnostic information pertaining to the operating status of at least one component of the climate control system for display on a display.

30. A method of controlling the operation of a controller for a climate control system having a low voltage power supply which may be connected to an external alternating current power source, a plug-in connection which may be connected to an external low voltage power supply, a processor for controlling the operation of the climate control system, a non-volatile memory, and a display, the method comprising the steps of:

determining the operating condition of at least one component of the climate control system;

storing diagnostic information pertaining to the operating condition of the at least one component of the climate control system;

detecting the presence of a connection of an external low voltage power supply to a plug-in connection for supplying power to the processor and the absence of a connection to an external alternating current power source; and responsively communicating the stored diagnostic information pertaining to the operating condition of the at least one component of the climate control system.

31. The method of claim 30, further comprising the step of the processor communicating the diagnostic status information to the display.

32. The method of claim 31, further comprising the step of displaying either an operable or an inoperable diagnostic status.

* * * * *